United States Patent
Yamamoto (10) Patent No.: US 9,742,103 B2
(45) Date of Patent: Aug. 22, 2017

(54) CONNECTOR

(71) Applicant: Sumitomo Wiring Systems, Ltd., Yokkaichi, Mie (JP)

(72) Inventor: Hironobu Yamamoto, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 14/844,850

(22) Filed: Sep. 3, 2015

(65) Prior Publication Data
US 2016/0079700 A1   Mar. 17, 2016

(30) Foreign Application Priority Data
Sep. 17, 2014  (JP) ................................. 2014-189147

(51) Int. Cl.
| | |
|---|---|
| *H01R 13/52* | (2006.01) |
| *B60R 16/00* | (2006.01) |
| *H01R 13/648* | (2006.01) |
| *H01R 13/6581* | (2011.01) |
| *H01R 13/6592* | (2011.01) |

(52) U.S. Cl.
CPC ......... *H01R 13/5227* (2013.01); *B60R 16/00* (2013.01); *H01R 2201/26* (2013.01)

(58) Field of Classification Search
CPC ............ H01R 13/5205; H01R 13/5202; H01R 13/648; H01R 13/6581; H01R 13/6592; H01R 13/6593; H01R 9/032
USPC ............................ 439/190, 206, 447, 607.44
See application file for complete search history.

(56) References Cited

U.S. PATENT DOCUMENTS

| | | | | |
|---|---|---|---|---|
| 7,934,950 | B2 * | 5/2011 | Yong ..................... | H01R 13/74 439/559 |
| 8,562,377 | B2 * | 10/2013 | Kawamura ............ | H01R 9/032 439/607.44 |
| 8,747,143 | B2 * | 6/2014 | Ichio .................. | B60L 11/1818 439/358 |
| 9,287,667 | B2 * | 3/2016 | Kawamura ........ | H01R 13/6593 |
| 9,293,878 | B2 * | 3/2016 | Tashiro ............... | H01R 13/506 |
| 2013/0277087 | A1 | 10/2013 | Hayakawa et al. | |
| 2015/0364856 | A1 * | 12/2015 | Nakai ................ | H01R 13/6581 439/587 |

(Continued)

FOREIGN PATENT DOCUMENTS

JP           2013237428 A      11/2013

OTHER PUBLICATIONS

WO 2014/112146—WIPO Publication of Nakai PCT/JP2013/070868.*

*Primary Examiner* — Amy Cohen Johnson
*Assistant Examiner* — Matthew T Dzierzynski
(74) *Attorney, Agent, or Firm* — Reising Ethington P.C (57) ABSTRACT

A connector that can make it easy to manufacture a metal mold for cover manufacturing is provided. A connector includes a connector body and a cover that covers the region between the connector body and a parking brake cable. The connector body includes a body-side attachment portion to which the cover is attached, and the body-side attachment portion is formed with an elliptic cylindrical shape. The cover includes a cover-side attachment portion for attachment to the body-side attachment portion of the connector body, and the cover-side attachment portion is formed with a true circle cylindrical shape so as to have an opening portion that is shaped as a true circle.

2 Claims, 9 Drawing Sheets

(56) References Cited

U.S. PATENT DOCUMENTS

2016/0100509 A1\* 4/2016 Yanagihara ............ H01R 9/034
                                                                             174/350
2016/0118744 A1\* 4/2016 Wittrock ............. B60L 11/1818
                                                                             439/191

\* cited by examiner

CONNECTOR

This Application claims the benefit of Japanese Application No. JP2014-189147, filed on Sep. 17, 2014, the contents of which are hereby incorporated by reference in their entirety.

FIELD

The present invention relates to a connector for attachment to a vehicle harness.

BACKGROUND

Figure 8:
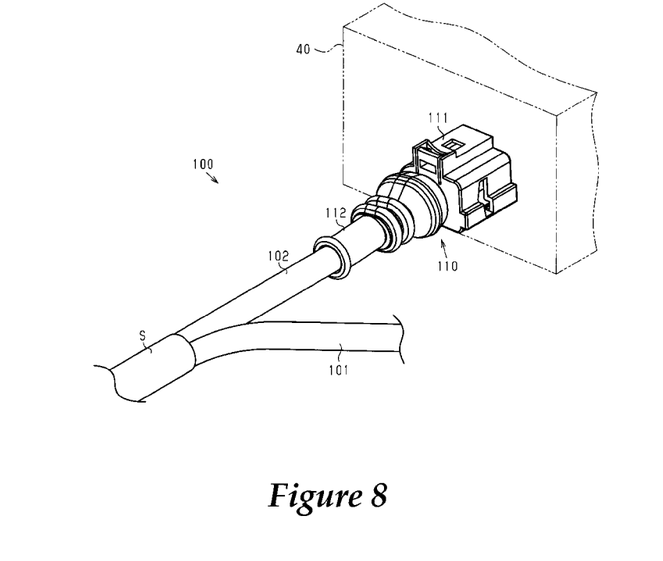
FIG. 8 is a perspective view of a compound harness according to a prior art example.

Vehicles such as automobiles are equipped with an electric parking brake (EPB) system and an antilock brake system (ABS). In recent years, due to the attachment positions of the ABS sensor and the EPB mechanism being near each other, a compound harness 100 has been developed in which, as shown in FIG. 8, a cable 102 for the electric parking brake system and a cable 101 for the ABS sensor are collectively enveloped by one sheath S. There are cases where various types of cables (wire harnesses) are connected to various systems such as these via connectors (e.g., see JP 2013-237428A).

JP 2013-237428A is an example of related art.

Figure 9:
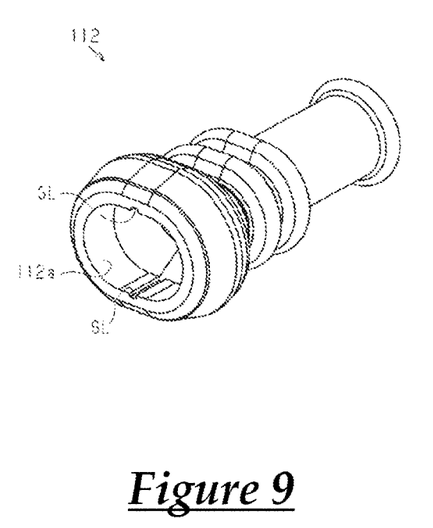
FIG. 9 is a perspective view of a cover according to the prior art example.

As shown in FIG. 8 for example, a connector 110 such as that described above has a connector body 111 and a cover 112 for attachment to the connector body 111. As shown in FIG. 8, the cover 112 is attached to the side of the connector body 111 on which the cable 102 is connected. As shown in FIG. 9, the cover 112 is shaped as a cylinder to allow insertion of the cable 102. More specifically, an opening portion 112a on one side is formed with an elliptic cylindrical shape for attachment to an elliptic cylindrical body-side attachment portion (the same as a body-side attachment portion 23 in FIG. 2) provided on the connector body 111. The connector body 111 (body-side attachment portion) is inserted (fitted) into the opening portion 112a of the cover 112.

When this type of connector is attached to the exterior of the vehicle, there is a risk of intrusion of water or the like, and therefore tape is wrapped around the connector so as to cross the boundary between the cable 102 and the cover 112 (the opening portion on the side opposite to the opening portion 112a) in order to minimize the intrusion of water. However, there is a risk of the intrusion of water into the cover 112 due to detachment of the tape, ageing deterioration of the cover 112, and the like. In view of this, it is preferable to provide a water drainage slit SL, for example, in the cover 112 that is to be attached to the connector body 111. However, since the slit SL is provided in the cover 112, the structure of the cover 112 is more complex than in the case where the slit SL is not provided, and this has been accompanied by increased complexity in the metal mold used in cover manufacturing.

SUMMARY

The present connector has been achieved in order to solve the above-described problems, and an object thereof is to provide a connector that can make it easier to manufacture the metal mold used in cover manufacturing.

A connector that solves the above-described problems is a connector including a connector body and a cover that covers a region between the connector body and a wire harness, wherein the connector body includes a body-side attachment portion to which the cover is attached, the body-side attachment portion being formed with an elliptic cylindrical shape, and the cover includes a cover-side attachment portion for attachment to the body-side attachment portion of the connector body, the cover-side attachment portion being formed with a true circle cylindrical shape so as to have an opening portion that is shaped as a true circle.

According to this configuration, the cover-side attachment portion is shaped as a true circle in contrast to the body-side attachment portion that is shaped as an elliptic cylinder, and therefore when the body-side attachment portion is inserted into the opening portion of the cover-side attachment portion, a gap is likely to be formed between the cover-side attachment portion and the body-side attachment portion at the minor axis portion of the body-side attachment portion unlike the major axis portion of the body-side attachment portion. Accordingly, water can drain through the gap, the need to provide a separate slit is eliminated, and it is easy to manufacture the metal mold used when manufacturing the cover.

In the above-described connector, it is preferable that the cover-side attachment portion is configured such that a diameter of the opening portion is longer than a minor axis of the body-side attachment portion.

According to this configuration, the opening portion of the cover-side attachment portion is configured to be longer than the minor axis of the body-side attachment portion, and therefore the gap is necessarily formed between the body-side attachment portion and the cover-side attachment portion, thus making it possible for water drainage to be performed more reliably.

According to the above-described connector, it is possible to make it easier to manufacture a metal mold used in cover manufacturing.

DESCRIPTION

Hereinafter, an embodiment of a configuration in which a connector is attached to a parking brake cable will be described with reference to the drawings.

Figure 1:
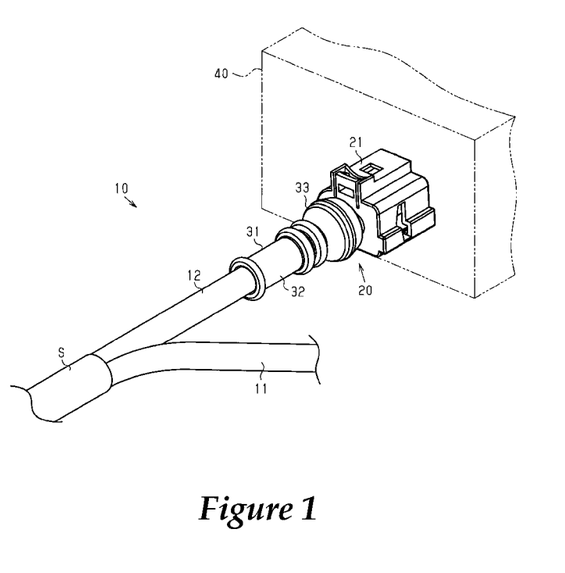
FIG. 1 is a perspective view of a compound harness according to an embodiment.

As shown in FIG. 1, a compound harness 10 of the present embodiment is constituted by an ABS sensor cable 11 and a parking brake cable 12 that are integrated by being covered with a common sheath S.

An ABS sensor (not shown) is attached to an end portion of the ABS sensor cable 11. Also, the ABS sensor cable 11 has a signal line for the transmission of signals.

The parking brake cable 12 is used as a conductive path for the flow of a current for activating a mechanism for braking the rotation of vehicle wheels (an electric parking brake (EPB) mechanism) in accordance with an operation of pressing a predetermined button mainly after the vehicle has been stopped. The parking brake cable 12 electrically connects an EPB control unit (not shown) and an EPB mechanism 40. For this reason, the parking brake cable 12 has two power lines. Note that examples of types of EPB mechanisms 40 include a type in which the wire of a conventional parking brake mechanism is pulled by an actuator, and a type in which a hydraulic brake caliper is equipped with a dedicated electric actuator.

Also, a connector 20 is attached to one end of the parking brake cable 12, and the parking brake cable 12 is connected to the EPB mechanism 40 via the connector 20.

As shown in FIG. 1, the connector 20 has a connector body 21 and a cover 31.

Figure 2:
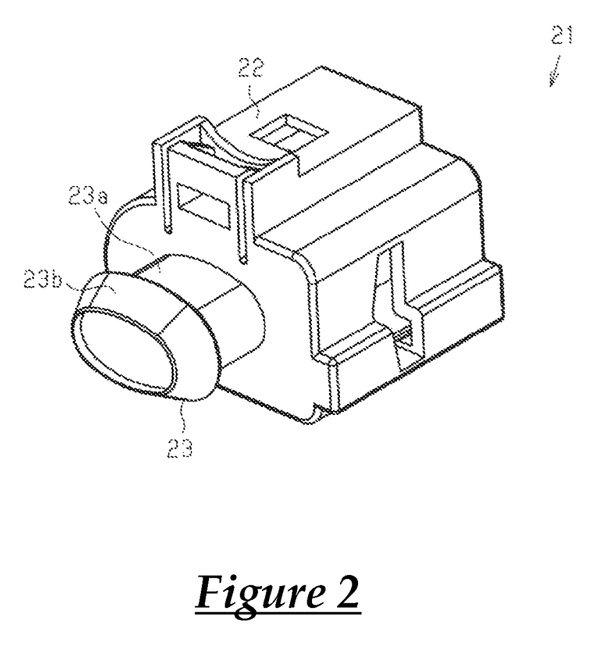
FIG. 2 is a perspective view of a connector body according to the embodiment.

As shown in FIGS. 1 and 2, the connector body 21 has a mounting portion 22 that is mounted to a connector receiving portion provided on the EPB mechanism 40, and a body-side attachment portion 23 to which the cover 31 is attached.

The mounting portion 22 has an approximately rectangular cylinder shape, and is constituted to be able to be attached to the connector receiving portion provided on the EPB mechanism 40.

As shown in FIGS. 1 and 2, the body-side attachment portion 23 is formed with an approximately elliptic cylindrical shape, and extends from the side of the mounting portion 22 opposite to the side that is connected to the EPB mechanism 40. The body-side attachment portion 23 has a first extending portion 23a that extends from the mounting portion 22, and a second extending portion 23b that extends from the first extending portion 23a and has a larger diameter (major axis and minor axis) than the diameter of the first extending portion 23a.

Figure 5:
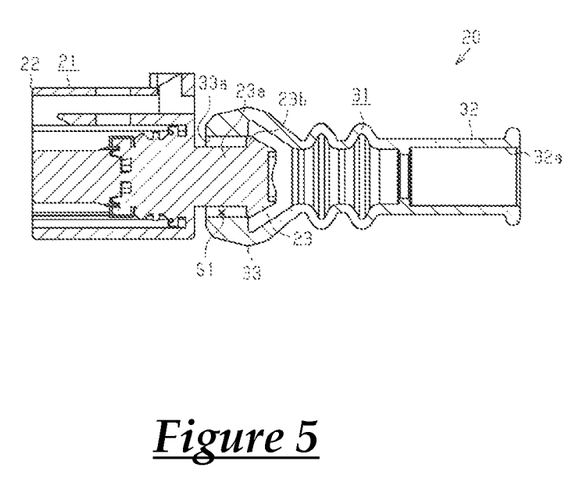
FIG. 5 is a cross-sectional view taken along 5-5 in FIG. 4.
Figure 6:
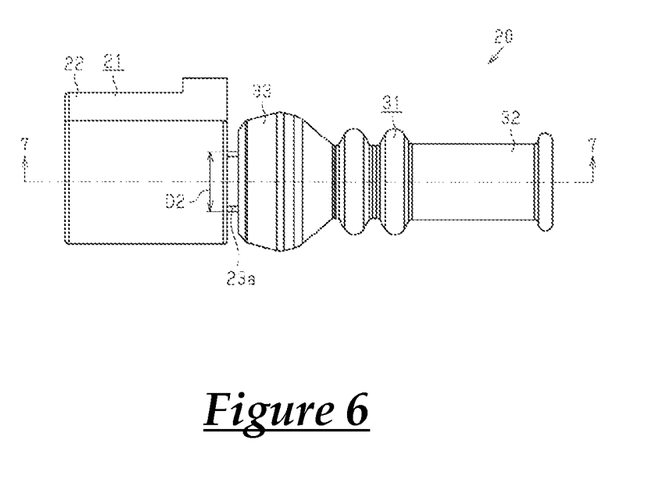
FIG. 6 is a front view of the connector according to the embodiment.
Figure 7:
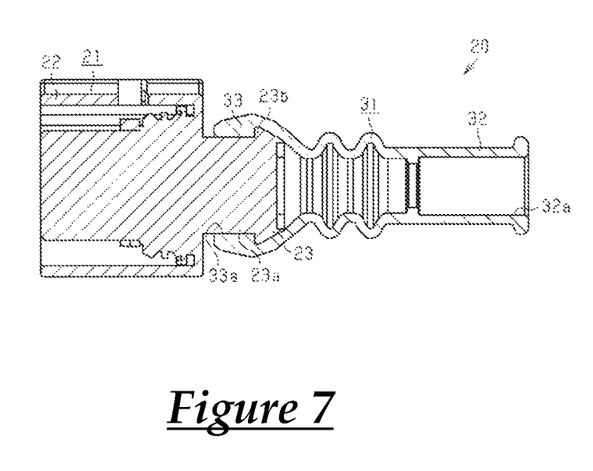
FIG. 7 is a cross-sectional view taken along 7-7 in FIG. 6.

As shown in FIGS. 1, 5, and 7, the second extending portion 23b is shaped so as to protrude farther radially outward than the first extending portion 23a. Also, the second extending portion 23b has a tapered shape in which the diameter decreases toward the tip side (the side opposite to the first extending portion 23a).

The cover 31 has an approximately cylindrical shape, and has a cable insertion portion 32 and a cover-side attachment portion 33.

Figure 3:
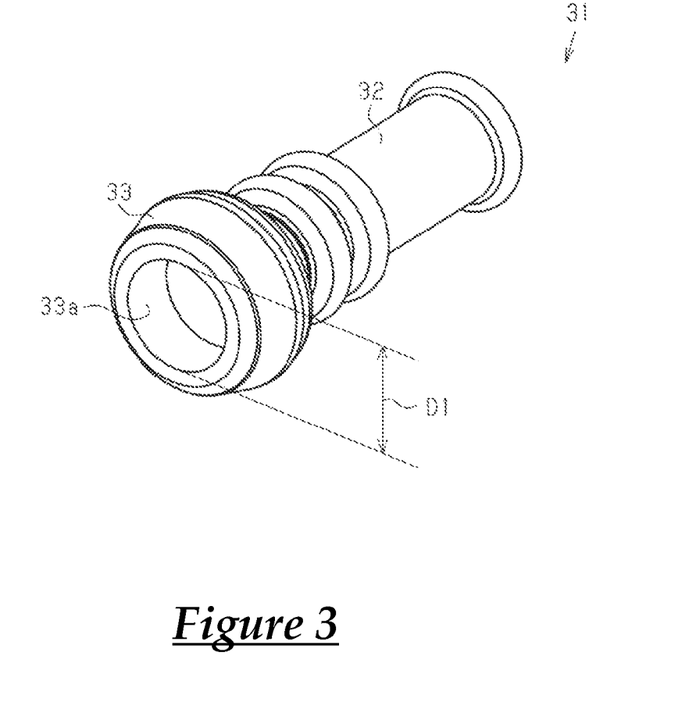
FIG. 3 is a perspective view of a cover according to the embodiment.
Figure 4:
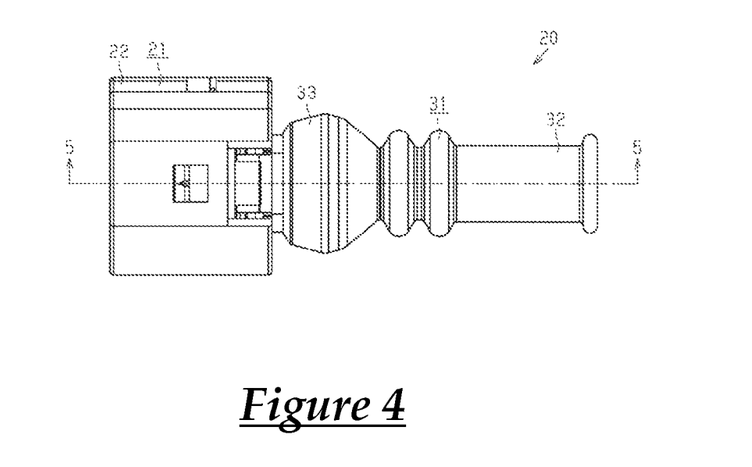
FIG. 4 is a top view of a connector according to the embodiment.

As shown in FIGS. 1 and 3, the cable insertion portion 32 has an opening portion 32a, and the parking brake cable 12 is inserted into the opening portion 32a.

As shown in FIGS. 3 to 7, the cover-side attachment portion 33 has an opening portion 33a whose opening area is larger than that of the opening portion 32a of the cable insertion portion 32. The opening portion 33a of the cover-side attachment portion 33 is formed such that the shape of the opening is a true circle shape. The opening portion 33a of the cover-side attachment portion 33 receives insertion of the body-side attachment portion 23 of the connector body 21. Also, the opening portion 33a of the cover-side attachment portion 33 is configured such that a diameter D1 thereof (see FIG. 3) is longer than a minor axis D2 (see FIG. 6) of the body-side attachment portion 23 (the first extending portion 23a).

Next, operations of the present embodiment will be described.

The compound harness 10 of the present embodiment has the ABS sensor cable 11 and the parking brake cable 12. A signal detected by the ABS sensor is transmitted by the ABS sensor cable 11. Furthermore, power is supplied to the EPB mechanism 40 by the parking brake cable 12.

Here, the parking brake cable 12 is connected to the EPB mechanism 40 by the connector 20 attached to the tip of the parking brake cable 12. Since the opening portion 33a of the cover-side attachment portion 33 of the cover 31 is shaped as a true circle, a gap S1 (see FIG. 5) is formed between the opening portion 33a and the minor axis portion of the elliptic cylindrical body-side attachment portion 23 (first extending portion 23a) of the connector 20. For this reason, water can be drained through the gap S1 by, for example, the cover 31 being bent relative to the connector body 21 along with the parking brake cable 12 due to vehicle vibration or the like.

Next, effects of the present embodiment will be described.

Since the cover-side attachment portion 33 is shaped as a true circle in contrast to the body-side attachment portion 23 that is shaped as an elliptic cylinder, when the body-side attachment portion 23 is inserted into the opening portion 33a of the cover-side attachment portion 33, the gap S1 is likely to be formed between the cover-side attachment portion 33 and the body-side attachment portion 23 at the minor axis portion of the body-side attachment portion 23 unlike the major axis portion of the body-side attachment portion 23. Accordingly, water can drain through the gap S1, the need to provide a separate slit is eliminated, and it is easy to manufacture the metal mold for manufacturing the cover 31.

Since the opening portion 33a of the cover-side attachment portion 33 is configured to be longer than the minor axis of the body-side attachment portion 23, the gap S1 is necessarily formed between the body-side attachment portion 23 and the cover-side attachment portion 33, thus making it possible for water drainage to be performed more reliably.

Note that the embodiment described above may be modified as follows.

The compound harness 10 constituted by the parking brake cable 12 and the ABS sensor cable 11 that are covered with the common sheath S is employed in the above embodiment, but there is no limitation to this. For example, the parking brake cable 12 and the ABS sensor cable 11 may be separate members.

A configuration in which the connector 20 is provided on the end portion of the parking brake cable 12 is employed in the above embodiment, but there is no limitation to this. For example, the connector 20 may be employed in the ABS sensor cable 11, a cable used in an electric brake other than a parking brake, or the like.

The above embodiment and the modified examples may be combined as necessary.

LIST OF REFERENCE NUMERALS

10 Compound harness
11 ABS sensor cable
12 Parking brake cable (wire harness)
20 Connector
21 Connector body
22 Mounting portion
23 Body-side attachment portion
23a First extending portion
23b Second extending portion
31 Cover
32 Cable insertion portion 32a Opening portion
33 Cover-side attachment portion
33a Opening portion
D1 Diameter
D2 Minor axis
S Sheath
S1 Gap

The invention claimed is:

1. A connector comprising a connector body and a separate cover that covers a region between the connector body and a wire harness;

the connector body includes a body-side attachment portion to which the cover is attached and a mounting portion, the body-side attachment portion being formed with an elliptic cylindrical shape, the body-side attachment portion extending from the mounting portion so that both the body-side attachment portion and the mounting portion are part of the connector body; and the cover includes a cover-side attachment portion for attachment to the body-side attachment portion of the connector body and a cable insertion portion, the cover-side attachment portion being formed with a true circle cylindrical shape so as to have an opening portion that is shaped as a true circle, the cover-side attachment portion extending from the cable insertion portion so that both the cover-side attachment portion and the cable insertion portion are part of the cover, wherein a gap is formed between the cover-side attachment portion and the body-side attachment portion when connected.

2. The connector according to claim 1, wherein the cover-side attachment portion is configured such that a diameter of the opening portion is longer than a minor axis of the body-side attachment portion.

* * * * *